United States Patent [19]
O'Neill

[11] 3,845,619
[45] Nov. 5, 1974

[54] COMPOSITE HEAT-CONDUCTING MEANS

[75] Inventor: John Sidney O'Neill, Alcester, England

[73] Assignee: British Leyland Truck and Bus Division Limited, Leyland, England

[22] Filed: July 18, 1973

[21] Appl. No.: 380,336

[30] Foreign Application Priority Data
July 25, 1972 Great Britain.................... 34624/72

[52] U.S. Cl.............. 60/39.51 H, 60/39.31, 308/77, 415/212, 415/409
[51] Int. Cl. ............................................ F02c 7/10
[58] Field of Search ...... 308/77; 415/178, 177, 180, 415/212, 122 R; 60/39.51 H; 417/409

[56] References Cited
UNITED STATES PATENTS

| | | | |
|---|---|---|---|
| 3,274,429 | 9/1966 | Swiadek | 315/3.6 |
| 3,490,746 | 1/1970 | Bell | 415/177 |
| 3,706,483 | 12/1972 | Irwin | 308/77 |

*Primary Examiner*—Carlton R. Croyle
*Assistant Examiner*—O. T. Sessions
*Attorney, Agent, or Firm*—Brisebois & Kruger

[57] ABSTRACT

In a gas turbine engine the housing for the power turbine shaft is hollow and contains compacted copper powder.

3 Claims, 3 Drawing Figures

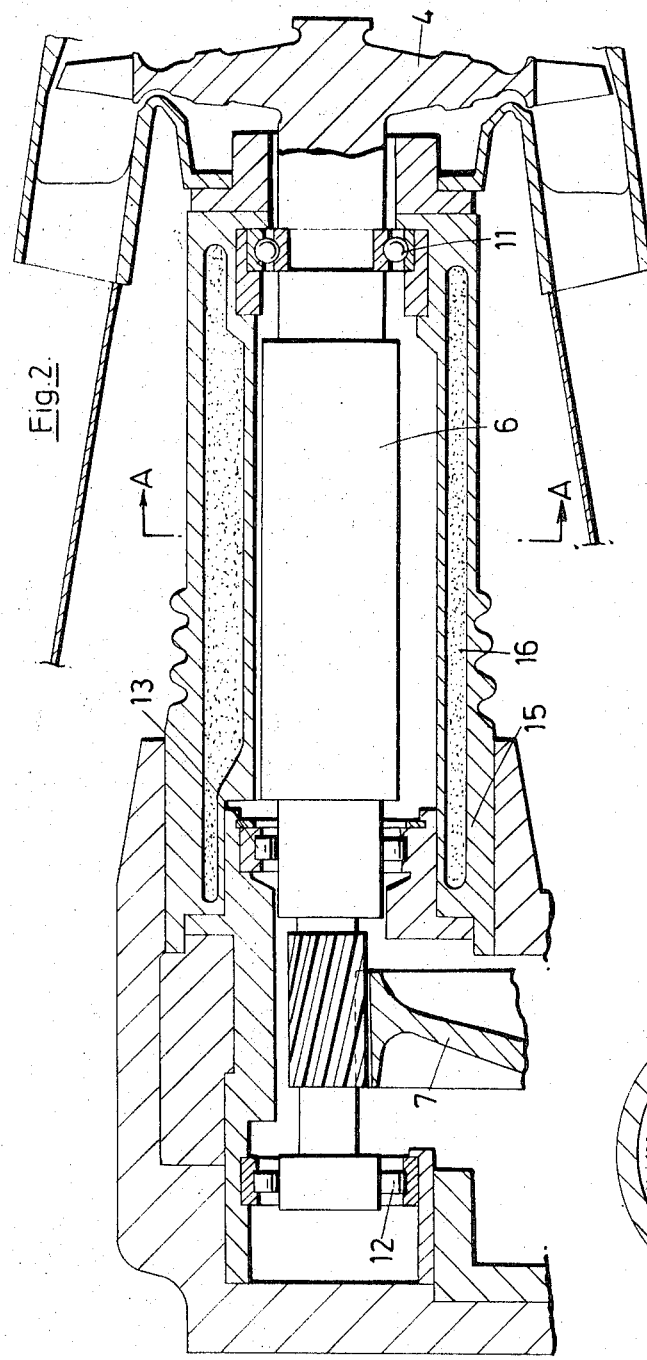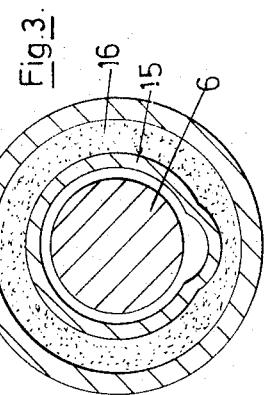

COMPOSITE HEAT-CONDUCTING MEANS

This invention relates to composite heat conducting means and is particularly (though not exclusively) applicable to gas turbine engines and other high-temperature turbomachines.

In gas turbine engines, or any other machine in which high-temperature rotors are situated adjacent high-speed bearings, it is essential to maintain the bearings at an acceptably low temperature. This is normally achieved, when the engine is running, by providing the bearings with an adequate supply of lubricating oil from a pump driven by the engine. However, this supply of cooling oil ceases when the engine stops and the residual heat in the turbine rotor can be sufficient to damage the bearing adjacent the turbine rotor. This bearing is especially vulnerable to the effect of heat-soak in the case of a gas turbine engine having a regenerative heat-exchanger and a thermally-insulated main casing, because the residual heat in the turbine rotor on shut down is virtually prevented from being dissipated to atmosphere.

The primary object of the present invention is to provide in a gas turbine engine or other high temperature turbomachine, an improved heat-flow path to the cooler extremities of the engine or machine, and thus distribute the residual heat load on shut down.

According to this invention composite heat-conducting means comprises a hollow steel structure (eg. the turbine shaft housing of a turbomachine) which is filled with compacted copper powder. To achieve maximum density of the filling, the copper powder employed consists of a blend of substantially spherical particles in the ratio of 20% 300 mesh ($50\mu$) and the remainder 100/150 mesh ($200\mu$), this blend being compacted by vibration. The preferred density of the powder filling is at least 75%.

When applying the present invention to a gas turbine engine, it is desirable to maintain the existing thermal expansion characteristics of the engine and to obtain improved thermal conductivity along the existing principal heat-flow path, which is mainly by way of the turbine shaft housing. Therefore, according to one aspect of the invention a gas turbine engine is characterised by having in a turbine shaft bearing housing, a filling of compacted copper powder.

How the invention may be carried out will now be described, by way of example only, and with reference to the accompanying drawings in which:

FIG. 2 is a detailed, part-sectional view, of the turbine shaft and housing of FIG. 1 and embodying the present invention; and FIG. 3 is a section on the line A—A of FIG. 2.

Figure 1:
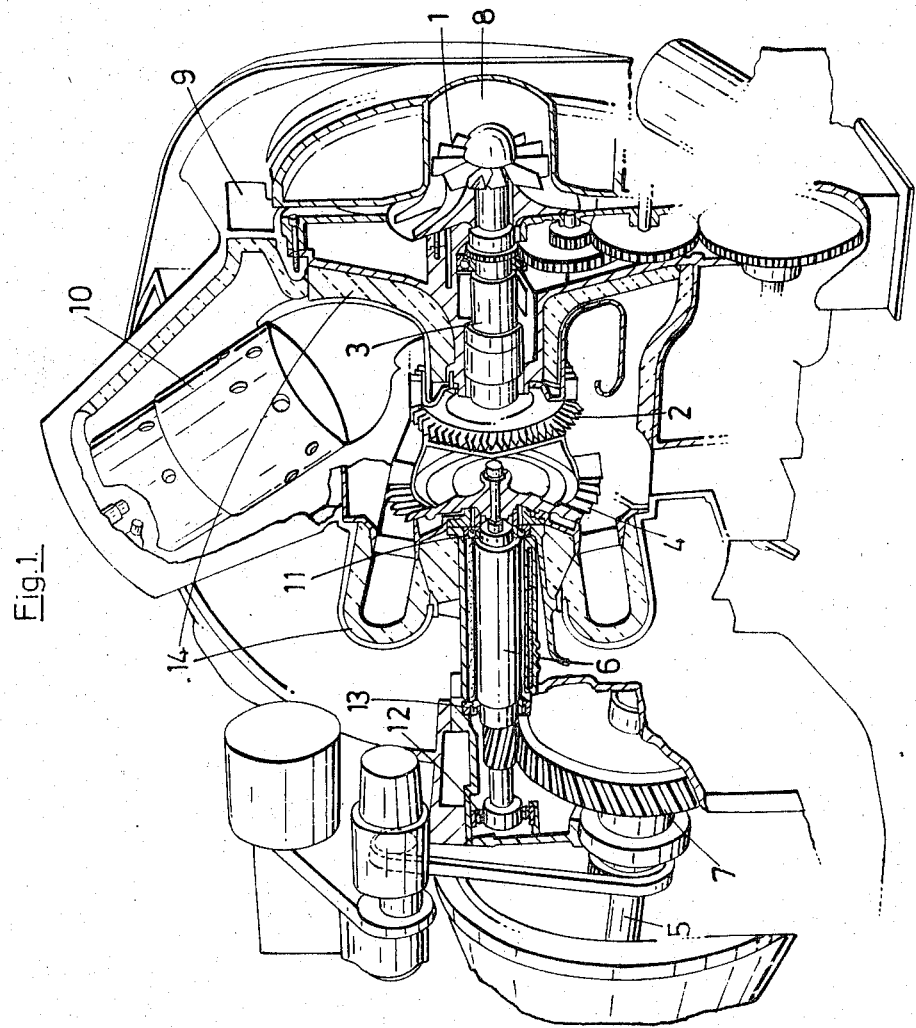
FIG. 1 is a diagrammatic, partly cut-away view of a gas turbine engine to which the present invention may be applied.

A gas turbine engine has a centrifugal compressor 1 which is driven by a drive-turbine 2 through shaft 3. A power turbine 4 drives a power output shaft 5 through a power turbine shaft 6 and reduction gear 7.

Air enters the engine through an inlet 8, is compressed by the compressor 1 and passes radially outwardly through an annular passage 9 and thence through the "cold-side" of rotary regenerative heat exchanger (not shown). The heat exchanger is of the kind disclosed in our British Patent No. 1,290,087. The regenerator imparts exhaust heat to the compressed air which then passes through the combustion chamber 10 where it has fuel injected into it and ignited.

The heated and thermally expanded air then passes through the two turbine discs 2 and 4 to drive them, and thence to an exhaust outlet of the engine (not shown).

The present invention is concerned with the construction of the housing of the power turbine shaft 6. This shaft 6 is supported at one end in a ball-bearing assembly 11 and at its other end in roller-bearing assemblies 12 and 13.

As mentioned above, because the engine is provided with a thermal regenerator and consequently with extensive thermal insulation 14 there is a problem in keeping these bearings at a sufficiently low temperature during "hot-soak" conditions, ie. when the engine is not running and no lubricant is being circulated.

The inventive feature is the fact that the housing 15 of the turbine shaft 6 is made hollow and is filled with compacted powdered copper 16. Preferably the copper powder employed consists of a blend of substantially spherical particles in the ratio 20% 300 mesh ($50\mu$) and the remainder 100/150 mesh ($200\mu$). This blend is then compacted by vibration so that the preferred density of filling is at least 75%.

What we claim is:

1. A gas turbine engine comprising:
   a. a turbine;
   b. a shaft on which the turbine is mounted,
   c. bearing means supporting the shaft along its length; and
   d. a hollow housing around the shaft which supports the bearing means and contains a compacted copper powder substantially 20% of said powder having a 300 mesh particle size, while the remainder has a particle size of substantially 100–150 mesh in order to render said powder more highly thermally conductive.

2. A gas turbine engine as claimed in claim 1 comprising a regenerative heat-exchanger.

3. A gas turbine engine as claimed in claim 1 in which the density of filling of said powder is at least 75%.

* * * * *